United States Patent
Jang

(10) Patent No.: US 8,310,551 B2
(45) Date of Patent: Nov. 13, 2012

(54) DIGITAL PHOTOGRAPHING APPARATUSES FOR CONTROLLING HAND SHAKE CORRECTION AND METHODS OF CONTROLLING THE DIGITAL PHOTOGRAPHING APPARATUS

(75) Inventor: Soon-geun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 398 days.

(21) Appl. No.: 12/432,957

(22) Filed: Apr. 30, 2009

(65) Prior Publication Data

US 2010/0002089 A1    Jan. 7, 2010

(30) Foreign Application Priority Data

Jul. 7, 2008    (KR) .................... 10-2008-0065632

(51) Int. Cl.
*H04N 5/228* (2006.01)
(52) U.S. Cl. ................. 348/208.16; 348/208.7
(58) Field of Classification Search .. 348/208.1–208.16, 348/208.99
See application file for complete search history.

(56) References Cited

U.S. PATENT DOCUMENTS

| 4,733,264 | A  | * | 3/1988  | Hatase et al. ................... 396/54 |
| 6,727,938 | B1 | * | 4/2004  | Randall ......................... 348/143 |
| 7,209,165 | B2 | * | 4/2007  | Ishikawa .................. 348/208.99 |
| 7,349,022 | B2 | * | 3/2008  | Okada ............................ 348/345 |
| 7,720,296 | B2 | * | 5/2010  | Hahn et al. .................... 382/236 |
| 7,839,437 | B2 | * | 11/2010 | Kasai et al. ................... 348/238 |
| 2004/0130628 | A1 | * | 7/2004 | Stavely ....................... 348/208.4 |
| 2007/0127830 | A1 | * | 6/2007 | Hanami ........................ 382/236 |
| 2007/0237506 | A1 | * | 10/2007 | Minema et al. ................ 396/52 |

FOREIGN PATENT DOCUMENTS

KR    10-2004-0037605 A    5/2004

* cited by examiner

*Primary Examiner* — Tuan Ho
(74) *Attorney, Agent, or Firm* — Drinker Biddle & Reath LLP

(57) ABSTRACT

Provided are a digital photographing apparatuses and methods of controlling the same. The method includes: inputting previous preview image data; inputting current preview image data; comparing and determining a pixel value of the previous preview image data and a pixel value of the current preview image data; and controlling the operation of a hand shake correcting unit according to the comparison and determination result. Accordingly, the hand shake correcting unit is selectively turned off by easily detecting a case where hand shake correction is not necessary, such as a case where a tripod is used, thereby reducing power consumption.

20 Claims, 7 Drawing Sheets

| 1 | 1 | 1 | 0 | 1 | 1 |
|---|---|---|---|---|---|
| 1 | 1 | 0 | 1 | 1 | 1 |
| 1 | 1 | 1 | 1 | 0 | 1 |
| 1 | 0 | 1 | 1 | 1 | 1 |
| 0 | 1 | 1 | 1 | 1 | 0 |

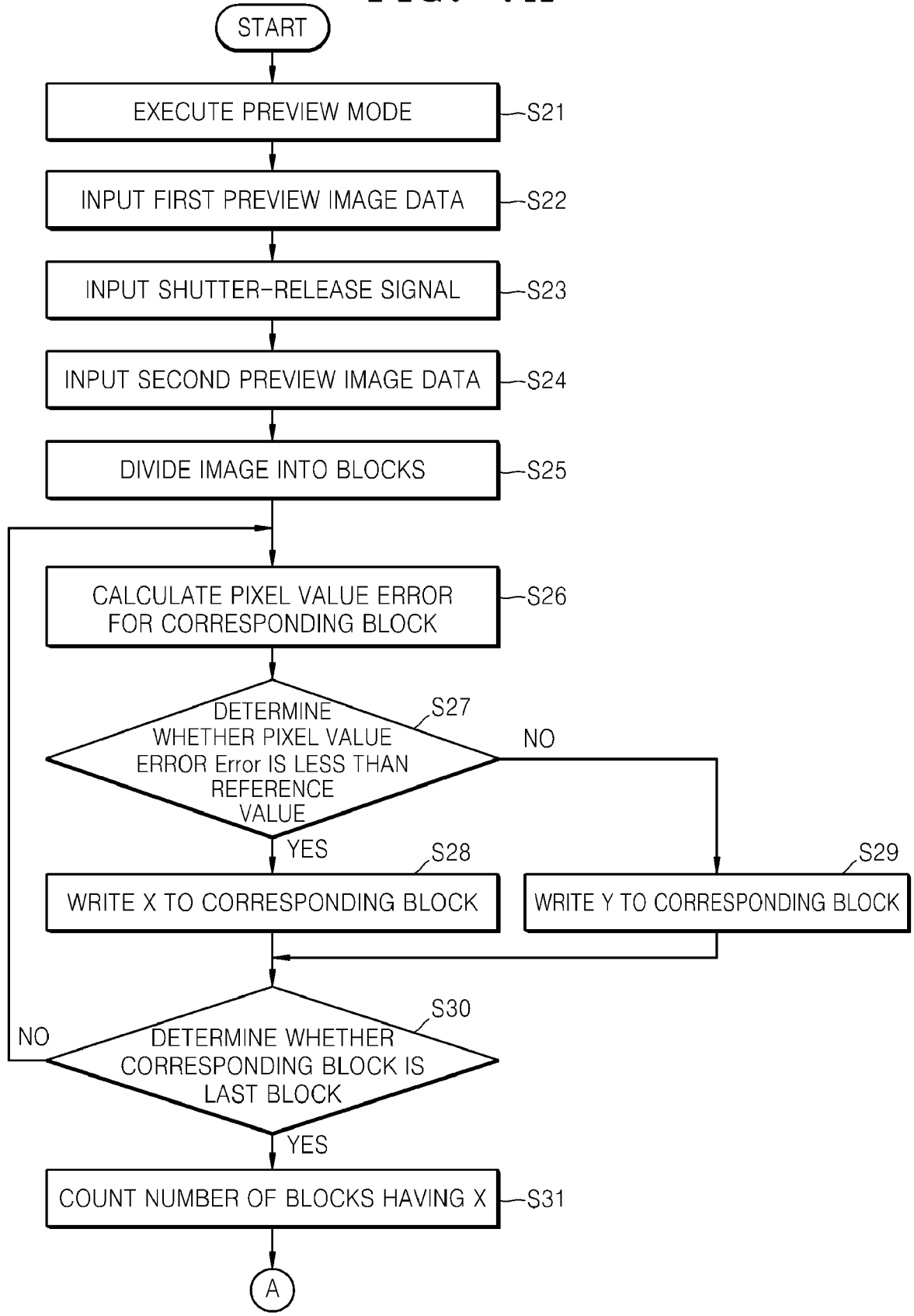

DIGITAL PHOTOGRAPHING APPARATUSES FOR CONTROLLING HAND SHAKE CORRECTION AND METHODS OF CONTROLLING THE DIGITAL PHOTOGRAPHING APPARATUS

CROSS-REFERENCE TO RELATED PATENT APPLICATION

This application claims the benefit of Korean Patent Application No. 10-2008-0065632, filed on Jul. 7, 2008 in the Korean Intellectual Property Office, the entire contents of which is incorporated herein by reference.

BACKGROUND OF THE INVENTION

1. Field of the Invention

The present invention relates to a digital photographing apparatus that corrects hand shake and a method of controlling the digital photographing apparatus for controlling hand shake.

2. Description of the Related Art

Digital photographing apparatuses for correcting hand shake have been marketed. For example, a digital camera including an optical image stabilizer that corrects hand shake by shifting a lens or an image pickup device determines that a tripod is used when a motion vector measured by a motion sensor is close to zero (0) and adjusts exposure information.

However, conventional photographing apparatuses determine whether a hand shake correcting unit is used by continuously operating a motion sensor in a preview mode before photographing, thereby resulting in much power consumption.

SUMMARY OF THE INVENTION

The present invention provides a digital photographing apparatus and a method of controlling the same which can reduce power consumption resulting from the continuous operation of a motion sensor by easily determining whether hand shake correction is necessary before photographing without using the motion sensor.

According to an aspect of the present invention, there is provided a method of controlling a digital photographing apparatus, the method comprising: comparing pixel values of a previous preview image data with pixel values of a current preview image data; and controlling the operation of a hand shake correcting unit based on the comparison.

The comparing may further comprise: calculating a pixel value error between the pixel value of the previous preview image data and the pixel value of the current preview image data; and comparing the pixel value error with a reference value.

The controlling may further comprise: turning off the hand shake correcting unit if the pixel value error is less than the reference value; and turning on the hand shake correcting unit if the pixel value error is not less than the reference value. The comparing may further comprises: dividing pixels of the preview image data into a plurality of blocks; calculating a pixel value error between the pixel values of the previous preview image data and the pixel values of the current preview image data for each block; comparing the pixel value error with a reference value for each block.

The controlling may further comprise: controlling the operation of the hand shake correcting unit according to the number of blocks greater than the reference value.

The pixel value error may be calculated as the square of a pixel value difference between the pixel value of the previous preview image data and the pixel value of the current preview image data.

The method may further comprise: comparing the pixel values of the current preview image data with pixel values of the next preview image data; if the comparison between the previous preview image data and the current preview image data is determined to be the same as the comparison between the current preview image data and the next preview image data, then turning off the hand shake correcting unit; and if it is determined that the comparison is not the same and the last preview image data is input, then turning on the hand shake correcting unit; and if the last preview image data is not input, then inputting a new next preview image and repeating the steps of the method on the new next preview image.

The current preview image data may be input at least when or after a shutter-release signal is input.

The method may further comprise inputting captured image data by turning on or off the hand shake correcting unit.

According to another aspect of the present invention, there is provided a digital photographing apparatus which may comprise: an image signal processing unit generating preview image data; a hand shake correction control unit controlling the operation of a hand shake correcting unit by comparing pixel values of previous preview image data and pixel values of a current preview image data; and the hand shake correcting unit correcting hand shake under the control of the hand shake correction control unit.

The hand shake correction control unit may comprise: a calculating unit calculating a pixel value error between the pixel values of the previous preview image and the pixel values of the current preview image; a comparing unit comparing the pixel value error with a reference value; and a controlling unit turning off the hand shake correcting unit if based on the comparison the pixel value error is less than the reference value, and turning on the hand shake correcting unit if the pixel value error is not less than the reference value.

The hand shake correction control unit may comprise: a block setting unit dividing pixels of the preview image into a plurality of blocks; a block calculating unit calculating a pixel value error between the pixel value of the previous preview image and the pixel value of the current preview image data for each block; a block comparing unit comparing the pixel value error with a reference value for each block; a counting unit writing the result of the block comparing unit and counting the number of blocks having the same comparison result; a number determining unit comparing the counted number of the blocks with a reference number; and a control unit controlling the operation of the hand shake correcting unit according to the result of the number determining unit.

The hand shake correction control unit may further comprise a maintenance determining unit determining whether the comparison of the pixel value error between the previous preview image data and the current preview image data with a reference value is the same as a comparison of the pixel value error between the current preview image data and a next preview image data with the reference value, wherein if the comparison is not the same and the last preview image data is input, the control unit turns on the hand shake correcting unit; and if the last preview image is not input, the control unit controls the image signal processing unit to output new next preview image data.

The hand shake correction control unit may further comprise a maintenance determining unit determining whether the comparison of the pixel value error between the previous preview image data and the current preview image data with a reference value is the same as a comparison of the pixel value error between the current preview image data and a next preview image data with the reference value, wherein if the comparison is not the same and the last preview image data is input, the control unit turns on the hand shake correcting unit; and if the last preview image is not input, the control unit controls the image signal processing unit to output new next preview image data.

The digital photographing apparatus may further comprise an operating unit inputting a shutter-release signal, wherein the current preview image data is generated at lest when or after the shutter-release signal is input.

The image signal processing unit may further generate captured image data when the hand shake correcting unit is turned on or off.

BRIEF DESCRIPTION OF THE DRAWINGS

The above and other features and advantages of the present invention will become more apparent by describing in detail exemplary embodiments thereof with reference to the attached drawings in which:

FIGS. 7A and 7B are flowcharts illustrating examples of methods of controlling a digital photographing apparatus, according to another embodiment of the present invention.

DETAILED DESCRIPTION OF THE INVENTION

The present invention will now be described more fully with reference to the accompanying drawings, in which exemplary embodiments of the invention are shown.

Figure 1:
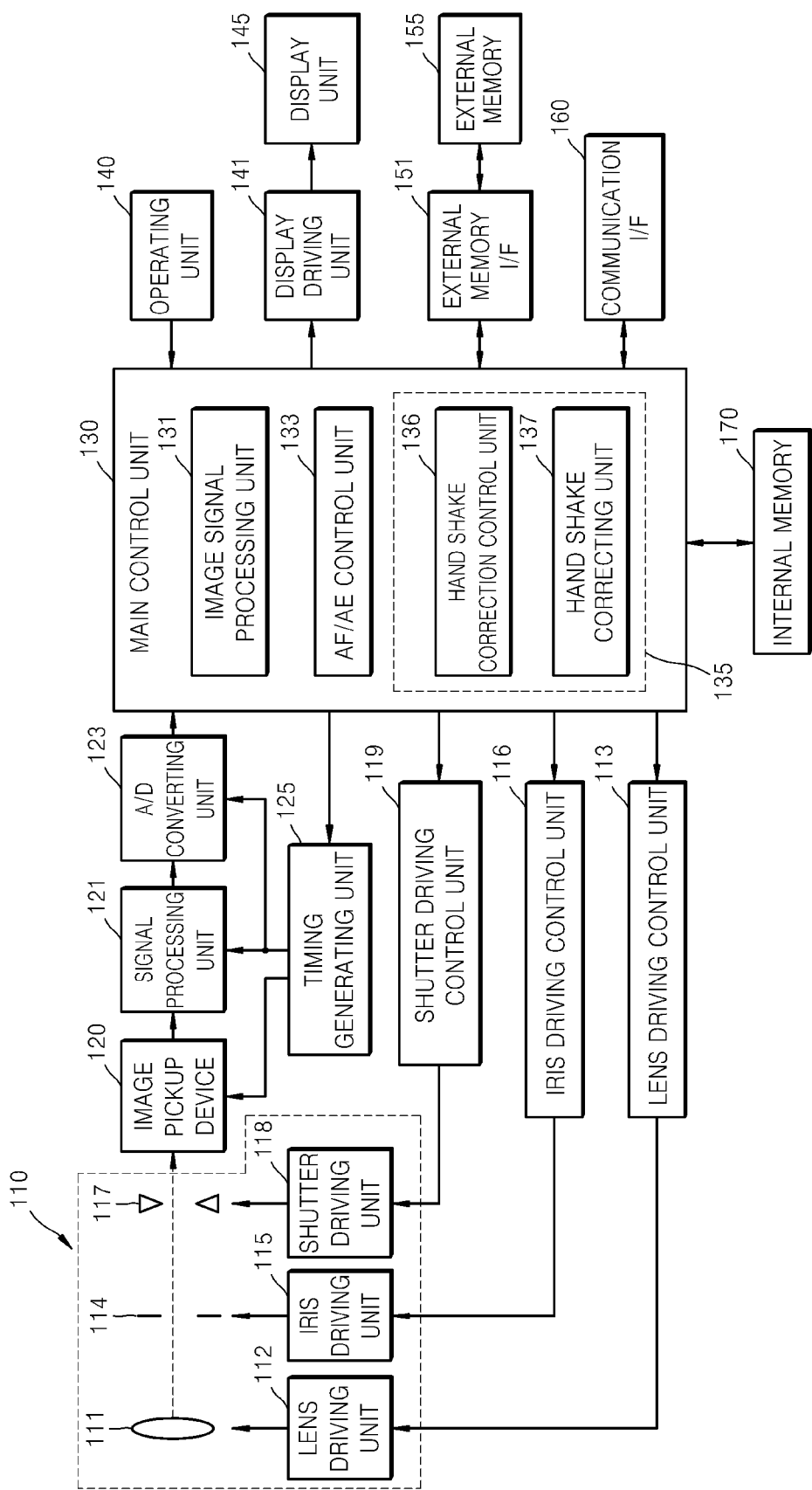
FIG. 1 is a block diagram of a an example of a digital photographing apparatus according to an embodiment of the present invention.

FIG. 1 is a block diagram of an example of a digital photographing apparatus according to an embodiment of the present invention.

Referring to FIG. 1, in an embodiment an optical unit 110 transmits an optical signal of an object to an image pickup device 120. In an embodiment, the image pickup device 120 receives the optical signal from the optical unit 110, converts the received optical signal into an electrical signal, and transmits the electrical signal to a signal processing unit 121. In an embodiment, the signal processing unit 121 receives and processes the electrical signal to remove noise from the electrical signal, and transmits the processed electrical signal to an analog/digital (A/D) converting unit 123. In an embodiment, the A/D converting unit 123 receives and converts the electrical signal into a digital image signal, and transmits the digital image signal to a main control unit 130.

The optical unit 110 may include a lens unit 111, an iris 114, and a shutter 117, and may further include a lens driving unit 112 driving the lens unit 111, an iris driving unit 115 driving the iris 114, and a shutter driving unit 118 driving the shutter 117.

The lens driving unit 112, the iris driving unit 115, and the shutter driving unit 118 may be controlled by a lens driving control unit 113, an iris driving control unit 116, and a shutter driving control unit 119, respectively. Each of the lens driving control unit 113, the iris driving control unit 116, and the shutter driving control unit 119 receives a predetermined control signal from the main control unit 130.

In an embodiment, a timing generating unit 125 generates a timing signal according to a control signal received from the main control unit 130, and the operations of the image pickup device 120, the signal processing unit 121, and the A/D converting unit 123 may be controlled according to the timing signal.

An image signal processing unit 131 receives and processes the digital image signal transmitted from the A/D converting unit 123 to generate image data. The image signal processing unit 131 may generate preview image data during a preview time and transmit the generated preview image data to an automatic focus/automatic exposure (AF/AE) control unit 132 and a hand shake correction control unit 135. The image signal processing unit 131 may generate captured image data of the object according to a shutter-release signal, and compress and transmit the generated captured image data to an internal memory 170 or an external memory 155 through an external memory interface (I/F) 151.

In an embodiment, the AF/AE control unit 133 of the main control unit 130 automatically controls focus and exposure by using the image data received from the image signal processing unit 131.

In an embodiment, the hand shake correction control unit 135 of the main control unit 130 includes a hand shake correction control unit 136 and a hand shake correcting unit 137. In an embodiment, the hand shake correction control unit 136 calculates a pixel value error between pixel values of the preview image data received in real time from the image signal processing unit 131, and controls the hand shake correcting unit 137 not to be operated if the pixel value error is less than a reference value. Embodiments, of the hand shake correction control unit 136 will be explained in detail with reference to FIGS. 2 through 5.

Accordingly, in an embodiment, the hand shake correction control unit 136 determines whether to operate the hand shake correcting unit 137. The digital photographing apparatus may correct hand shake by moving hardware components or by transforming a generated image. In embodiments, using hardware, once a hand shake sensor of the digital photographing apparatus senses hand shake, the digital photographing apparatus corrects the hand shake by continuously shifting the lens 111 or the image pickup device 120 in a direction opposite to that of the hand shake. In embodiments, ISO or the sensitivity of the image pickup device 120 to light is increased. The amount of light, which is necessary by the digital photographing apparatus to take photographs, is adjusted by using the iris 114 and the speed of the shutter 117. If the sensitivity of the image pickup device 120 to light is increased, light necessary for the image pickup device 120 to pick up an image can be more quickly secured, thereby reducing the risk of image blur due to hand shake. In an embodiment, a photo collage may be created by combining at least two photographs.

For example, in an embodiment, the digital photographing apparatus may further include a motion sensor. The hand shake correcting unit 137 may transmit a predetermined control signal to the lens driving control unit 113 according to a sensing signal output from the motion sensor. Alternatively, the digital photographing apparatus may further include an image pickup device driving unit and an image pickup device driving control unit, and the hand shake correcting unit 137 may transmit a control signal to the image pickup device driving control unit and to the image pickup device driving unit to shift the image pickup device 120.

The internal memory 170 of the digital photographing apparatus may store an image file and various additional information.

In an embodiment, an operating unit 140 receives a digital photographing apparatus control signal from a user and transmits the digital photographing apparatus control signal to the digital photographing apparatus. The operating unit 140 may include buttons, a touch screen, a keyboard, or a remote controller.

In an embodiment, a display driving unit 141 controls a display unit 145 to display the image data output from the image processing unit 131 as a predetermined image. The display driving unit 141 may include a scan driver or a data driver according to the type of the display unit 145. The display unit 145 may be a liquid crystal display (LCD) unit, an organic light emitting display (OLED) unit, an electrophoretic display (EDD) unit, or the like.

In an embodiment, the external memory I/F 151 transmits and receives information, such as an image file, to and from the detachable external memory 155.

In an embodiment, a communication interface I/F 160 transmits and receives information, such as an image file, to and from an external device in a wireless or wired way.

The digital photographing apparatus of FIG. 1 can reduce power consumption by not operating continuously operating the hand shake correcting unit 137. The hand shake correction control unit 136 controlling the hand shake correcting unit 137 will now be explained in detail.

Figure 2:
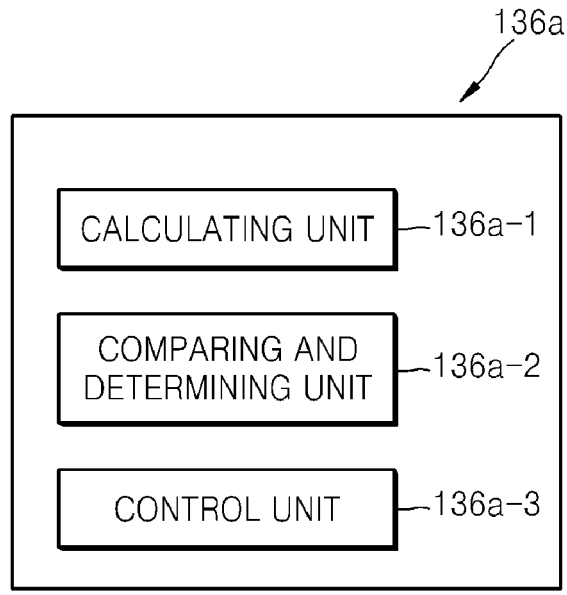
FIGS. 2, 3 and 5 are block diagrams of an example of a hand shake correcting control unit of the digital photographing apparatus of FIG. 1.

FIG. 2 is a block diagram of an example of a hand shake correction control unit 136a of the digital photographing apparatus of FIG. 1, according to an embodiment of the present invention.

Referring to FIG. 2, in an embodiment, the hand shake correction control unit 136a includes a calculating unit 136a-1 calculating a pixel value error between pixel values of previous preview image data and current preview image data, a comparing and determining unit 136a-2 comparing the pixel value error with a reference value, and a control unit 136a-3 turning off the hand shake correcting unit 137 if the pixel value error is less than the reference value and turning on the hand shake correcting unit 137 if the pixel value error is not less than the reference value.

In an embodiment, during a preview time, a preview image signal is input in real time through the optical unit 110, the image pickup device 120, the signal processing unit 121, and the A/D converting unit 123 of the digital photographing apparatus of FIG. 1. The image signal processing unit 131 processes the preview image signal, particularly so as to display the preview image signal on the display unit 145 during the preview time. Accordingly, the image signal processing unit 131 may generate preview image data. The preview image data constitutes one frame during the preview time.

In an embodiment, the calculating unit 136a-1 calculates a pixel value error between pixel values of previous preview image data and current preview image data. The previous preview image data and the current preview image data may constitute continuous frames in time, but the present invention is not limited thereto.

In an embodiment, the pixel value error is calculated by the calculating unit 136a-1, as defined by Equation 1 below and is the sum of squares of pixel value differences between pixel values of previous preview image data and current preview image data for all pixels.

$$\text{Error} = \sum_{x \in \Omega} |I_{i-1}(x) - I_i(x)|^2 \qquad (1.)$$

where X represents a two-dimensional (2D) coordinate system $(x,y)^T$ of an image, $\Omega$ represents all pixels in preview image data constituting one frame, $I_{i-1}(X)$ represents a pixel value of preview image data at a time point i−1, and $I_i(X)$ represents a pixel value of preview image data at a time point i. In an embodiment, $\Omega$ may represent a subset of all pixels in preview image data constituting one frame.

The preview image data at the time point i−1 may be referred to as previous preview image data, and the preview image data at the time point i may be referred to as current preview image data. In an embodiment, the current preview image data is input at least after a shutter-release signal is input. The shutter-release signal is a signal according to which captured image data of an object to be recorded and stored is generated. In an embodiment, when a user presses a shutter button to take photographs, the shutter-release signal may be generated. While the shutter-release signal may be generated when the user presses the shutter button half way to focus on the object, it is assumed in this and other embodiments that the shutter-release signal is generated when the user completely presses the shutter button to photograph the object.

In an embodiment, the pixel value error is the sum of squares of pixel value differences between pixels values of the preview image data. Accordingly, if a correlation between the previous preview image data and the current preview image data is high, the pixel value error is low, and if the correlation is low, the pixel value error is high. In an embodiment, if the correlation is high, since the previous preview image data and the current preview image data are very similar to each other, it may be determined that the preview image data is input with little hand shake, for example a tripod may be used. If the correlation is low, since the previous preview image data is quite different from the current preview image data, in an embodiment, it may be determined that the preview image data is input with hand shake or the object is moving. In an embodiment, if the correlation is high, since hand shake rarely happens, the hand shake correcting unit 137 does not need to be operated. Accordingly, a correlation high enough not to cause hand shake may be determined based on experience and may be used as a reference correlation. In an embodiment, a reference value when there is no hand shake, such as a case where a tripod is used, is preset, and the pixel value error is compared with the reference value. In an embodiment, the comparing and determining unit 136a-2 compares the pixel value error with the reference value. If the pixel value error is less than the reference value, the comparing and determining unit 136a-2 writes 1, and otherwise, the comparing and determining unit 136a-2e writes 0 as defined by Equation 2. Information 1 is written when no hand shake occurs, that is, a tripod is used, and the information 0 is written when hand shake occurs. The reference value may vary depending on a noise level of the preview image data. In embodiments, as the sensitivity of an image increases, noise increases. Accordingly, the reference value may be determined by measuring a noise level of an image according to sensitivity. A noise level may be measured by measuring the sum of squares of differences between preview image data constituting two images having the same sensitivity and histogramming the sum.

$$M(\text{Error}) = \begin{cases} 1 & \text{if Error} < \text{reference value} \\ 0 & \text{otherwise} \end{cases} \quad (2)$$

M(Error) is 0 not only when hand shake occurs but also when the object is moving. In an embodiment, in order to reduce power consumption used by the operation of the hand shake correcting unit 137, the shake correcting unit control unit 136a of FIG. 2 determines whether a correlation between previous and current preview image data is high indicating the use of a tripod or other steadying of the apparatus.

In an embodiment, the comparing and determining unit 136a-2 determines whether M(Error) is 0 or 1, and transmits the determination result to the control unit 136a-3. If the comparing and determining unit 136a-2 determines that M(Error) is 0, the control unit 136a-3 determines that hand shake occurs and turns on the hand shake correcting unit 137. If the comparing and determining unit 136a-2 determines that M(Error) is 1, the control unit 136a-3 determines that no hand shake occurs and turns off the hand shake correcting unit 137 such that the hand shake correcting unit 137 is not operated.

Figure 3:
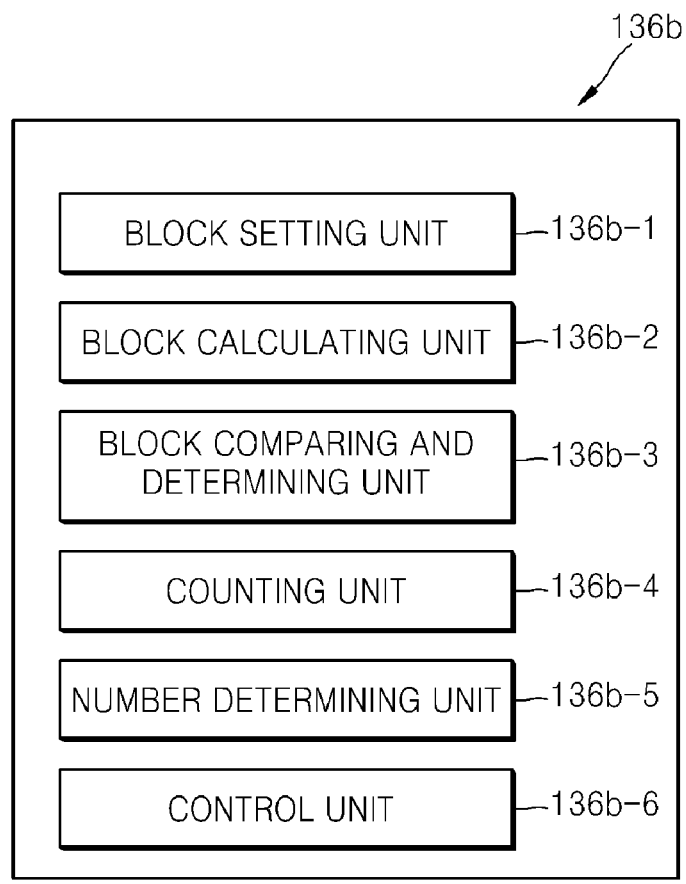

FIG. 3 is a block diagram of an example of a hand shake correction control unit 136b of the digital photographing apparatus of FIG. 1, according to another embodiment of the present invention. Referring to FIG. 3, in an embodiment, an image is divided into N blocks, a pixel value error is calculated for each block, and the operation of the hand shake correcting unit 137 is controlled according to the calculated pixel value error.

Referring to FIG. 3, in an embodiment, the hand shake correction control unit 136b includes a block setting unit 136b-1, a block calculating unit 136b-2, a block comparing and determining unit 136b-3, a counting unit 136b-4, a number determining unit 136b-5, and a control unit 136b-6. In an embodiment, the block setting unit 136b-1 divides image data constituting one frame into N blocks.

In an embodiment, the block calculating unit 136b-2 calculates a pixel value error between previous preview image data and current preview image data for each block. The pixel value error is the sum of squares of pixel value differences between pixel values of previous preview image data and current preview image data for all pixels of each block as defined by Equation 3.

$$\text{Error}_j = \sum_{x \in \text{Block}_j} |B_{i-1,j}(x) - B_{i,j}(x)|^2, \quad (3.)$$

$$j = 1 \ldots N$$

where X represents a 2D coordinate system $(x,y)^T$ of an image, $\text{Block}_j$ represents all pixels of a corresponding divided region, $B_{i-1,j}(X)$ represents a pixel value of preview image data at a time point i−1, and $B_{i,j}(X)$ is a pixel value of preview image data at a time point i.

In an embodiment, the preview image data at the time point i−1 is referred to as previous preview image data, and the preview image data at the time point i is referred to as current preview image data. The pixel value error for each block may be calculated as described in equation 3 as the sum of squares of pixel value differences between pixel values of the preview image data for each block.

The pixel value error for each block, $\text{Error}_j$, is compared with a reference value. In an embodiment, the comparing and determining unit 136b-3 compares the pixel value $\text{Error}_j$ with the reference value. If the pixel value $\text{Error}_j$ is less than the reference value, the block comparing and determining unit 136b-3 may write 1, and otherwise, the block comparing and determining unit 136b-3 may write 0 as defined by Equation 4. In an embodiment, information 1 is written when the hand shake correcting unit 137 is not operated, and information 0 is written when the hand shake correcting unit 137 is operated.

Figures 4, 5:
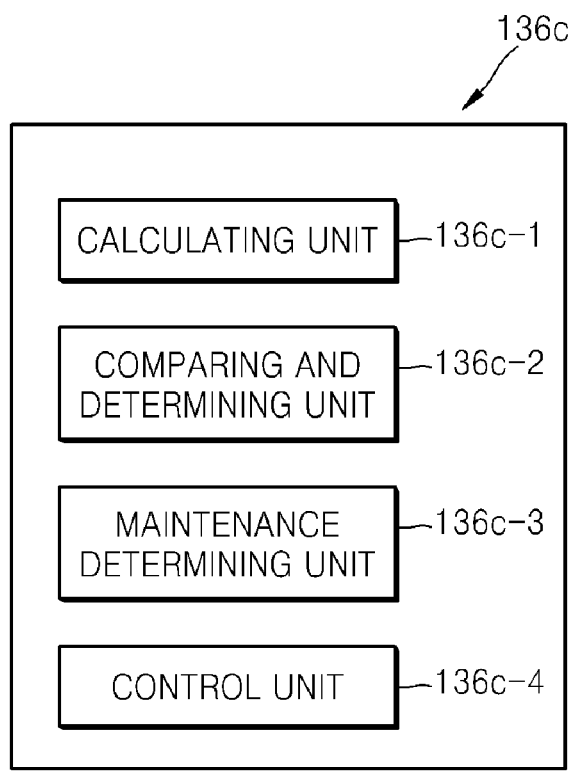
FIG. 4 is a table for an example illustrating a operation of the hand shake correcting control unit of FIG. 3 according to embodiments of the present invention.

Accordingly, data as shown in the example of FIG. 4 may be stored for an image divided into N blocks.

In an embodiment, the counting unit 136b-4 may count the number of blocks having information 1 and/or 0. For example, if the number of blocks having information 1 is greater than a predetermined number, it may be determined that a correlation between previous preview image data and current preview image data is high. If the number of blocks having data 1 is not higher than the predetermined number, it may be determined that a correlation between previous preview image data and current preview image data is low. It may be the number determining unit 136b-5 that compares and determines whether the number of blocks having predetermined information is greater than a reference number.

$$H(\text{Error}_j, j = 1 \ldots N) = \begin{cases} 1 & \text{if } \sum_{j=1}^{N} M(\text{Error}_j) > \text{reference number} \\ 0 & \text{otherwise} \end{cases} \quad (4.)$$

where $$\sum_{j=1}^{N} M(\text{Error}_j)$$

represents the sum of blocks having been calculated as either 1 or 0 as described above. Accordingly, if the sum $$\sum_{j=1}^{N} M(\text{Error}_j)$$

is greater than the reference number, $H(\text{Error}_j, j=1 \ldots M)$ is 1, and otherwise, $H(\text{Error}_j, j=1 \ldots M)$ is 0. In an embodiment, information 1 is written when a correlation between previous preview image data and current preview image data is high, that is, a tripod or other steadying device may be used, and thus the hand shake correcting unit 137 is turned off. Information 0 is written when the hand shake correcting unit 137 is turned on.

In an embodiment, if the number determining unit 136b-5 determines that $H(\text{Error}_j, j=1 \ldots M)$ is 1, the control unit 136b-6 turns off the hand shake correcting unit 137, and if the number determining unit 136b-5 determines that $H(\text{Error}_j, j=1 \ldots M)$ is 0, the control unit 136b-6 turns on the hand shake correcting unit 137.

FIG. 5 is a block diagram of an example of a hand shake correction control unit 136c of the digital photographing apparatus of FIG. 1, according to another embodiment of the present invention. In an embodiment, referring to FIG. 5, not only a correlation between previous preview image data and current preview image data but also a correlation between next preview image data is determined, and if a correlation is maintained, the operation of the hand shake correcting unit 137 is controlled according to the maintained correlation. Current preview image data is generated when a shutter-release signal is input, and subsequent preview image data may be continuously generated and input before captured image data of an object is generated. Accordingly, the preview image data generated after the current preview image data is referred to as next preview image data.

In FIG. 5, in an embodiment, whether a correlation between a plurality of pieces of preview image data is maintained is determined based on the above method of calculating the pixel value error of FIG. 2. However, the present invention is not limited thereto, and whether a correlation between a plurality of pieces of preview image data is maintained may be determined based on the method of calculating the pixel value error of FIG. 3. The operation of the hand shake correcting unit 137 may be controlled according to the maintained correlation.

Referring to FIG. 5, in an embodiment, the hand shake correction control unit 136c of the digital photographing apparatus includes a calculating unit 136c-1, a comparing and determining unit 136c-2, a maintenance determining unit 136c-3, and a control unit 136c-4. The calculating unit 136c-1 calculates a pixel value error between pixel values of preview image data input in real time. In an embodiment, the pixel value error is the sum of squares of pixel value differences between previous preview image data and current preview image data for each of pixels constituting one frame.

In an embodiment, the comparing and determining unit 136c-2 determines whether the pixel value error is less than a reference value. In an embodiment, if the pixel value error is less than the reference value, the comparing and determining unit 136c-2 determines that a correlation between the preview image data is high. If the pixel value error is not less than the reference value, the comparing and determining unit 136c-2 determines that a correlation between the preview image data is low.

In an embodiment, the maintenance determining unit 136c-3 determines whether the correlation between previous preview image data and current preview image data and the correlation between the current preview image data and next preview image data are the same. The maintenance determining unit 136c-3 may determine the correlation for 5 pieces of preview image data constituting 5 frames.

In an embodiment, if the maintenance determining unit 136c-3 determines that the correlation is maintained, the control unit 136c-4 may turn off the hand shake correcting unit, and otherwise, the control unit 13c-4 may turn on the hand shake correcting unit.

In an embodiment, if the pixel value error between the previous preview image data and the current preview image data is less than the reference value and information 1 is written, and also, if the pixel value error between the current preview image data and the next preview image data is less than the reference value and information 1 is written, the maintenance determining unit 136c-3 determines that a first determination result obtained by comparing the pixel value error between the previous preview image data and the current preview image data with the reference value and a second determination result obtained by comparing the pixel value error between the current preview image data and the next preview image data with the reference value are the same. In an embodiment, the information 1 is written when the hand shake correcting unit 137 is turned off. In an embodiment, the control unit 136c-4 turns off the hand shake correcting unit 137 if the maintenance determining unit 136c-3 determines that the first determination result and the second determination result are the same. If the first determination result obtained by comparing the pixel value error between the previous preview image data and the current preview image data with the reference value is not the same as the second determination result obtained by comparing the pixel value error between the current preview image data and the next preview image data with the reference value, the maintenance determining unit 136c-3 determines whether last preview image data is input, and if it is determined that the last preview image data is input, the control unit 136c-4 outputs a control signal to operate the hand shake correcting unit 137. In an embodiment, if it is determined that the last preview image data is not input, the image signal processing unit 131 outputs new next preview image data to the hand shake correction control unit 135. In an embodiment, the hand shake correction control unit 136c determines whether a pixel value error between the previous next preview image data and the new next preview image data is less than the reference value to obtain a third determination result and determines whether the third determination result is the same as the second determination result. The determination may be repeated until last preview image data is input.

In an embodiment, after it is finally determined through two or more determinations that hand shake correction is necessary, the hand shake correcting unit 137 is operated.

Methods of controlling a digital photographing apparatus will now be explained in detail.

Figure 6:
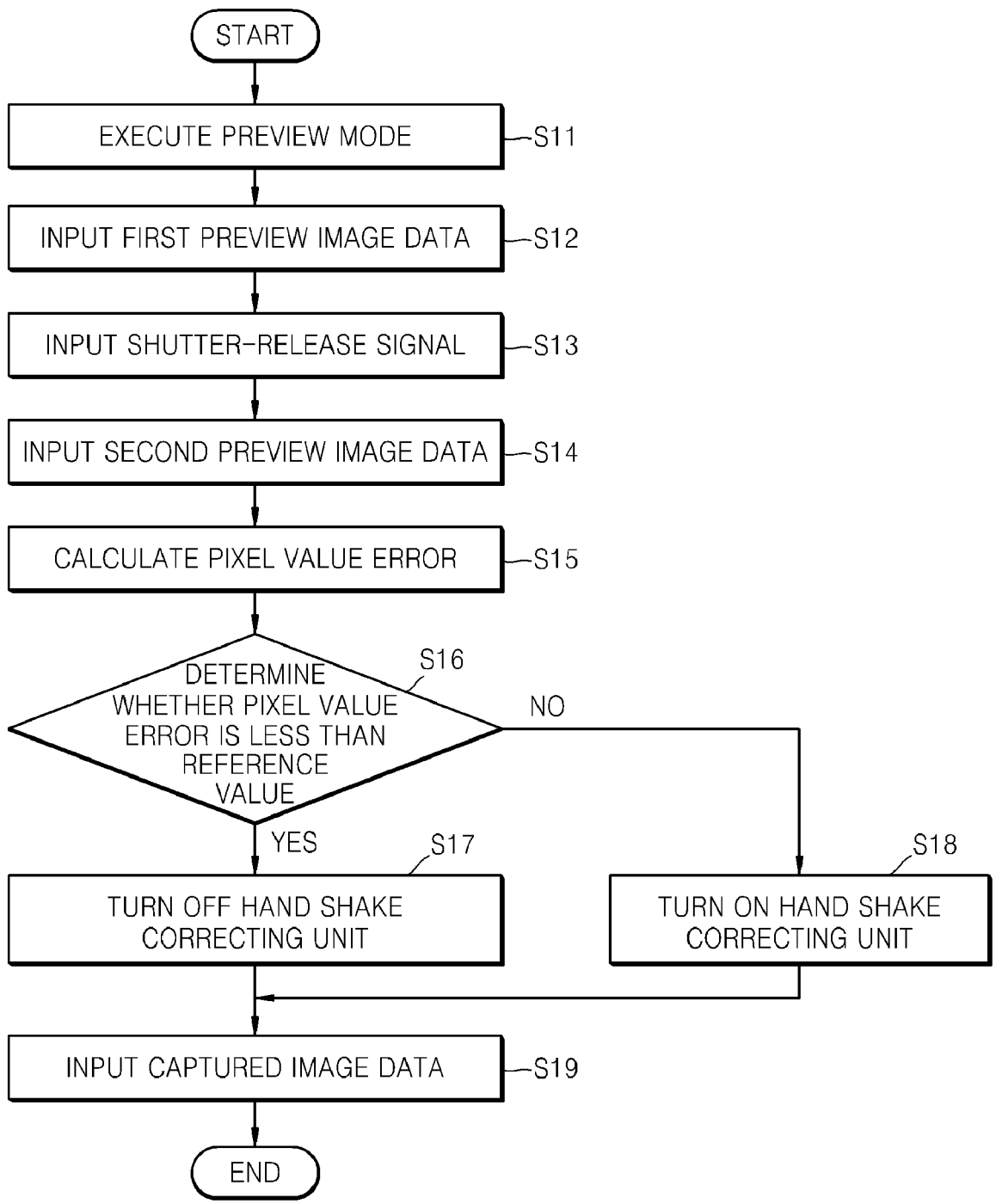
FIG. 6 is a flowchart illustrating an example of a method of controlling a digital photographing apparatus, according to an embodiment of the present invention.

FIG. 6 is a flowchart illustrating an example of an embodiment of a method of controlling a digital photographing apparatus, according to an embodiment of the present invention.

Referring to FIG. 6, in an embodiment, in operation S11, a preview mode is executed in the digital photographing apparatus.

In operation S12, first preview image data is input. Subsequent preview image data is input in real time. The preview image data may be processed image information constituting one frame.

In operation S13, a shutter-release signal is input. In operation S14, second preview image data is input at least when the shutter-release signal is input. The second preview image data, which is subsequent to the first preview image data, may be continuously input after the first preview image data, but the present invention is not limited thereto.

In operation S15, a pixel value error between the first preview image data and the second preview image data is calculated. The pixel value error may be the square of a pixel value difference between pixel values of the first preview image data and the second preview image data.

In operation S16, it is determined whether the pixel value error is less than a reference value. If it is determined in operation S16 that the pixel value error is less than the reference value, the method proceeds to operation S17. In operation S17, a hand shake correcting unit is turned off. If it is determined in operation S16 that the pixel value error is not less than the reference value, the method proceeds to operation S18. In operation S18, the hand shake correcting unit is turned on.

In operation S19, captured image data is input when the hand shake correcting unit is turned off or on.

Figure 7B:
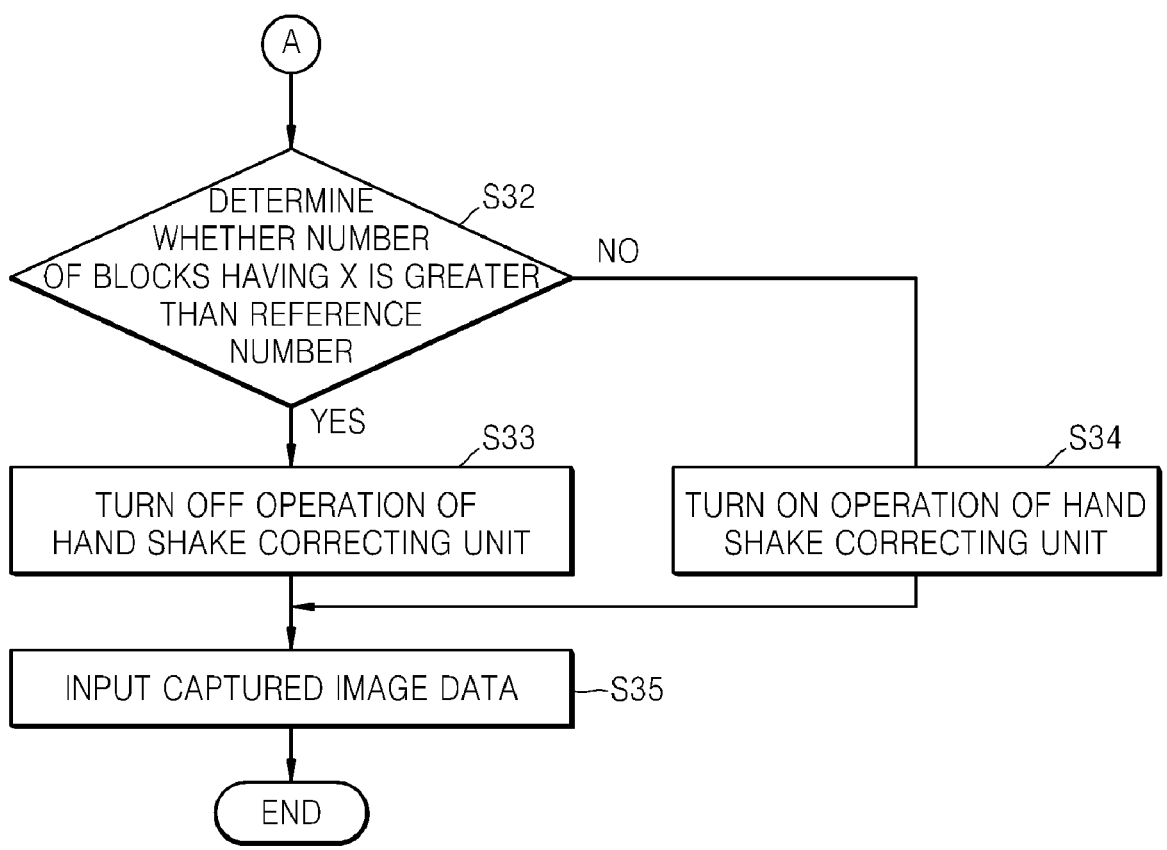

FIGS. 7A and 7B are flowcharts illustrating an example of an embodiment of a method of controlling a digital photographing apparatus.

Referring to FIG. 7A, in operation S21, a preview mode is executed in the digital photographing apparatus.

In operation S22, first preview image data is input. Subsequent preview image data may be input in real time.

In operation S23, a shutter-release signal is input. In operation S24, second preview image data is input.

In operation S25, an image constituting one frame is divided into at least two blocks. The division may be performed in an earlier step.

In operation S26, a pixel value error for a corresponding block is calculated. As described above, a pixel value error may be the square of a pixel value difference between pixels values of the first preview image data and the second preview image data, and for a block the pixel value error may be the sum of squares of pixel value differences between the first preview image data and the second preview image data for all pixels of the corresponding block.

In operation S27, it is determined whether the pixel value error is less than a reference value.

In an embodiment, if it is determined in operation S27 that the pixel value error is less than the reference value, the method proceeds to operation S28. In operation S28, information X is written to the corresponding block. The information X may be 1. The information 1 is written when a hand shake correcting unit is turned off as described above.

In an embodiment, if it is determined in operation S27 that the pixel value error is not less than the reference value, the method proceeds to operation S29. In operation S29, information Y is written to the corresponding block. The information Y may be 0. The information 0 is written when the hand shake correcting unit is turned on.

In operation S30, it is determined whether the corresponding block is a last block.

If it is determined in operation S30 that the corresponding block is not the last block, the method returns to operation S26 in which the pixel value error is calculated.

If it is determined in operation S30 that the compared and determined block is the last block, the method proceeds to operation S31. In operation S31, the number of blocks having information X is counted.

Referring to FIG. 7B, in operation S32, in an embodiment, it is determined whether the number of blocks having information X is greater than a reference number. If it is determined in operation S32 that the number of blocks having information X is greater than the reference number, the method proceeds to operation S33. In operation S33, the hand shake correcting unit is turned off. If it is determined in operation S32 that the number of blocks having information X is not greater than the reference number, the method proceeds to operation S34. In operation S34, the hand shake correcting unit is turned on.

In operation S35, captured image data of an object to be photographed by a user is input.

Although the number of blocks having information X is counted in FIGS. 7A and 7B, the present invention is not limited thereto and the number of blocks having information Y may be counted. In an embodiment, whether the number of blocks having information Y is less than a reference number may be determined and the hand shake correcting unit may be turned off if the number of blocks having information Y is determined to be less than the reference number.

Figure 8:
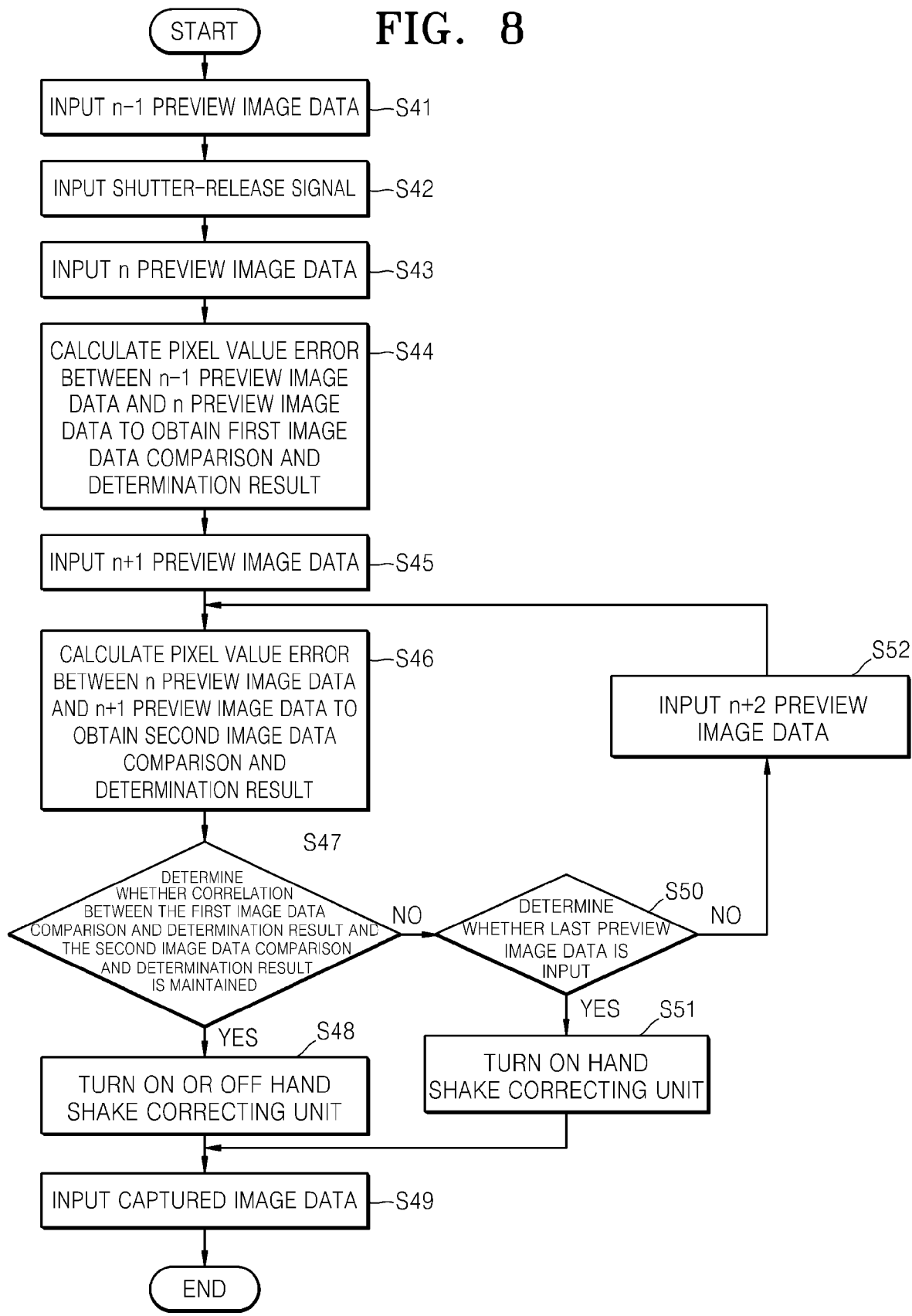
FIG. 8 is a flowchart illustrating a an example of a method of controlling a digital photographing apparatus, according to another embodiment of the present invention.

FIG. 8 is a flowchart illustrating an example of an embodiment of a method of controlling a digital photographing apparatus.

Referring to FIG. 8 in operation S41, in an embodiment, n−1 preview image data is input. The input n−1 preview image data may be arbitrarily stored at a predetermined time.

In operation S42, a shutter-release signal is input. In operation S43, n preview image data is input when or after the shutter-release signal is input.

In operation S44, a pixel value error between the n−1 preview image data and the n preview image data is calculated to obtain a first image data comparison and determination result. In an embodiment, the pixel value error may be calculated in the same way as that of the method of FIG. 6 or FIG. 7. Here, n may be a time point when the preview image data is generated and input when or right after the shutter-release signal is input.

In operation S45, n+1 preview image data is input.

In operation S46, a pixel value error between the n preview image data and the n+1 preview image data is calculated to obtain a second image data comparison and determination result.

In operation S47, it is determined whether a correlation between the first image data comparison and determination result and the second image data comparison and determination result is maintained.

If it is determined in operation S47 that the correlation is maintained, the method proceeds to operation S48. In operation S48, a hand shake correcting unit is turned on or off. In operation S49, captured image data is input.

If it is determined in operation S47 that the correlation is not maintained, the method proceeds to operation S50. In operation S50, it is determined whether last preview image data is input. If it is determined in operation S50 that the last preview image data is input, the method proceeds to operation S51. In operation S51, the hand shake correcting unit is turned on. In operation S49, captured image data is input.

If it is determined in operation S50 that the last preview image data is not input, the method proceeds to operation S52. In operation S52, n+2 preview image data is input. The method returns to operation S46 in which a pixel value error between the n+2 preview image data and the n+1 preview image data is calculated.

Although a correlation between pieces of preview image data that are continuously input in time is determined in FIGS. 6 through 8, the present invention is not limited thereto, and a correlation between pieces of preview image data that are input at predetermined intervals may be determined.

As described above, in an embodiment, a pixel value error between a pixel value of previous preview image data, which is input before a shutter-release signal, and a pixel value of current preview image data, which is input after the shutter-release signal, are compared with each other and a hand shake correcting unit is turned off if the pixel value error less than a reference value. Accordingly, since the hand shake correcting unit does may not be operated continuously, power consumption may be reduced.

For convenience, in the description above, the functionality described has been divided into a number of units; however, the number of units may vary and the functionality described above may be differently divided among the units, or the functionality described above may be implemented without units.

The functionality described above may be implemented in a number of ways. For example: digital circuits, and/or analog circuits, and/or one or more programmed processors.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of controlling a digital photographing apparatus, the method comprising:
 comparing pixel values of a previous preview image data with pixel values of a current preview image data; and
 controlling the operation of a hand shake correcting unit based on the comparison;
 wherein controlling the operation of a hand shake correcting unit comprises:
  turning off the hand shake correcting unit during photographing of an image if a result of the comparison meets a first criteria; and
  turning on the hand shake correcting unit during photographing of an image if the result of the comparison meets a second criteria;
  the hand shake correcting unit moving a hardware unit of the digital photographing apparatus when it is turned on, and not moving the hardware unit when it is turned off; wherein the hardware unit comprises at least one of a lens and an image pickup device of the digital photographing apparatus.

2. The method of claim 1, wherein the comparing further comprises:
 calculating a pixel value error between the pixel value of the previous preview image data and the pixel value of the current preview image data; and
 comparing the pixel value error with a reference value.

3. The method of claim 2, wherein:
 the first criteria is if the pixel value error is less than the reference value; and
 the second criteria is if the pixel value error is not less than the reference value.

4. The method of claim 1, wherein the comparing further comprises:
 dividing pixels of the preview image data into a plurality of blocks;
 calculating a pixel value error between the pixel values of the previous preview image data and the pixel values of the current preview image data for each block;
 comparing the pixel value error with a reference value for each block.

5. The method of claim 4, wherein the controlling further comprises controlling the operation of the hand shake correcting unit according to the number of the blocks greater than the reference value.

6. The method of claim 2, wherein the pixel value error is calculated as the square of a pixel value difference between the pixel value of the previous preview image data and the pixel value of the current preview image data.

7. The method of claim 4, wherein the pixel value error is calculated as the square of a pixel value difference between the pixel value of the previous preview image data and the pixel value of the current preview image data.

8. The method of claim 2, further comprising:
 comparing the pixel values of the current preview image data with pixel values of the next preview image data; if the comparison between the previous preview image data and the current preview image data is determined to be the same as the comparison between the current preview image data and the next preview image data, then turning off the hand shake correcting unit; and
 if it is determined that the comparison is not the same and the last preview image data is input, then turning on the hand shake correcting unit; and
 if the last preview image data is not input, then inputting a new next preview image and repeating the steps of the method on the new next preview image.

9. The method of claim 4, further comprising:
 comparing the pixel values of the current preview image data with pixel values of the next preview image data;
 if the comparison between the previous preview image data and the current preview image data is determined to be the same as the comparison between the current preview image and the next preview image, then turning off the hand shake correcting unit; and
 if it is determined that the comparisons are not the same and the last preview image data is input, then turning on the hand shake correcting unit; and
 if the last preview image data is not input, then inputting a new next preview image data and repeating the steps of the method on the new next preview image data.

10. The method of claim 1, wherein the current preview image data is input at least when or after a shutter-release signal is input.

11. The method of claim 1, further comprising inputting a captured image data by turning on or off the hand shake correcting unit.

12. A digital photographing apparatus comprising:
 an image signal processing unit configured to generate preview image data;
 a hand shake correction control unit configured to control operation of a hand shake correcting unit by comparing pixel values of previous preview image data and pixel values of a current preview image data; and
 the hand shake correcting unit correcting hand shake under the control of the hand shake correction control unit;
 the control of the operation of the hand shake correcting unit comprises:
  turning off the hand shake correcting unit during photographing of an image if a result of the comparison meets a first criteria; and
  turning on the hand shake correcting unit during photographing of an image if the result of the comparison meets a second criteria;
  the hand shake correcting unit configured to move a hardware unit of the digital photographing apparatus when it is turned on, and configured to not move the hardware unit when it is turned off; wherein the hardware unit comprises at least one of a lens and an image pickup device of the digital photographing apparatus.

13. The digital photographing apparatus of claim 12, wherein the hand shake correction control unit comprises:
 a calculating unit configured to calculate a pixel value error between the pixel values of the previous preview image and the pixel values of the current preview image;
 a comparing unit configured to compare the pixel value error with a reference value; and
 a controlling unit configured to turn off the hand shake correcting unit if based on the comparison the pixel value error is less than the reference value, and turn on the hand shake correcting unit if the pixel value error is not less than the reference value.

14. The digital photographing apparatus of claim 12, wherein the hand shake correction control unit comprises:
 a block setting unit configured to divide pixels of the preview image into a plurality of blocks;
 a block calculating unit configured to calculate a pixel value error between the pixel value of the previous preview image and the pixel value of the current preview image data for each block;

a block comparing unit configured to compare the pixel value error with a reference value for each block;

a counting unit configured to write the result of the block comparing unit and count the number of blocks having the same comparison result;

a number determining unit configured to compare the counted number of the blocks with a reference number; and a control unit configured to control the operation of the hand shake correcting unit according to the result of the number determining unit.

15. The digital photographing apparatus of claim 13, wherein:

the hand shake correction control unit further comprises a maintenance determining unit configured to determine whether the comparison of the pixel value error between the previous preview image data and the current preview image data with a reference value is the same as a comparison of the pixel value error between the current preview image data and a next preview image data with the reference value;

if the comparison is not the same and the last preview image data is input, the control unit turns on the hand shake correcting unit; and if the last preview image is not input, the control unit controls the image signal processing unit to output new next preview image data.

16. The digital photographing apparatus of claim 14, wherein:

the hand shake correction control unit further comprises a maintenance determining unit configured to whether the comparison of the pixel value error between the previous preview image data and the current preview image data with a reference value is the same as a comparison of the pixel value error between the current preview image data and a next preview image data with the reference value;

if the comparison is not the same and the last preview image data is input, the control unit turns on the hand shake correcting unit; and if the last preview image is not input, the control unit controls the image signal processing unit to output new next preview image data.

17. The digital photographing apparatus of claim 12, further comprises an operating unit configured to input a shutter-release signal, wherein the current preview image data is generated at least when or after the shutter-release signal is input.

18. The digital photographing apparatus of claim 12, wherein the image signal processing unit further generates captured images when the hand shake correcting unit is turned on or off.

19. The method of claim 1, wherein the hardware unit moved is at least one of a lens or image pickup device.

20. The digital photographing apparatus of claim 12, wherein the hardware unit moved is at least one of a lens or image pickup device.

* * * * *